Feb. 14, 1967  E. LARSON  3,303,918
FREEZING CHAMBER CONVEYOR
Filed June 14, 1965  3 Sheets-Sheet 1

INVENTOR.
EUGENE LARSON
BY
Lothrop & West
ATTORNEYS

Feb. 14, 1967 E. LARSON 3,303,918
FREEZING CHAMBER CONVEYOR
Filed June 14, 1965 3 Sheets-Sheet 2
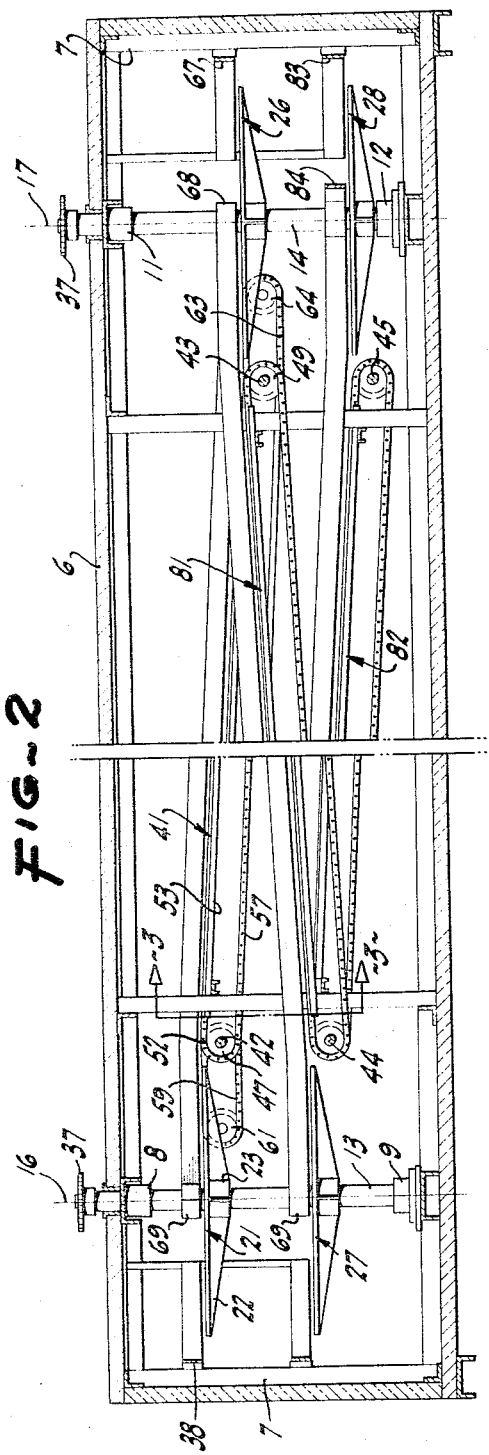
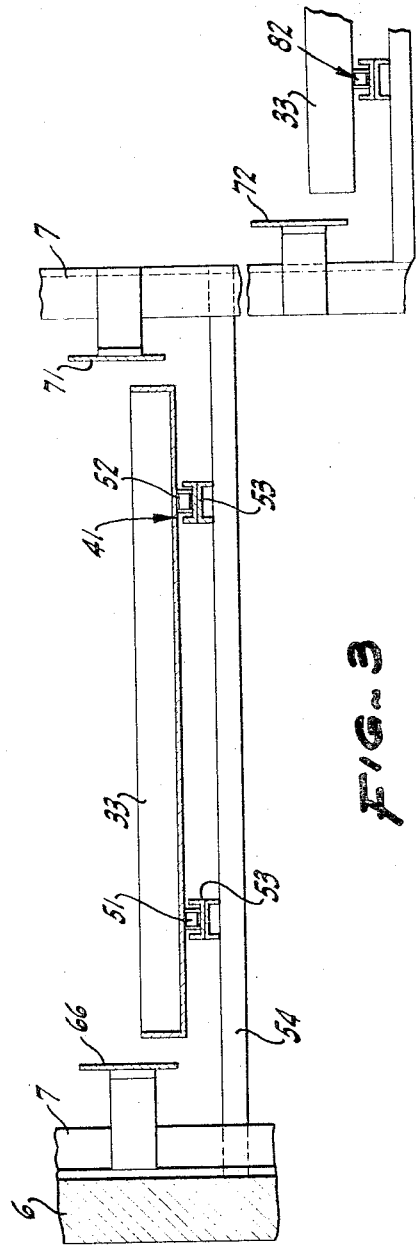
INVENTOR.
EUGENE LARSON
BY
Lothrop & West
ATTORNEYS

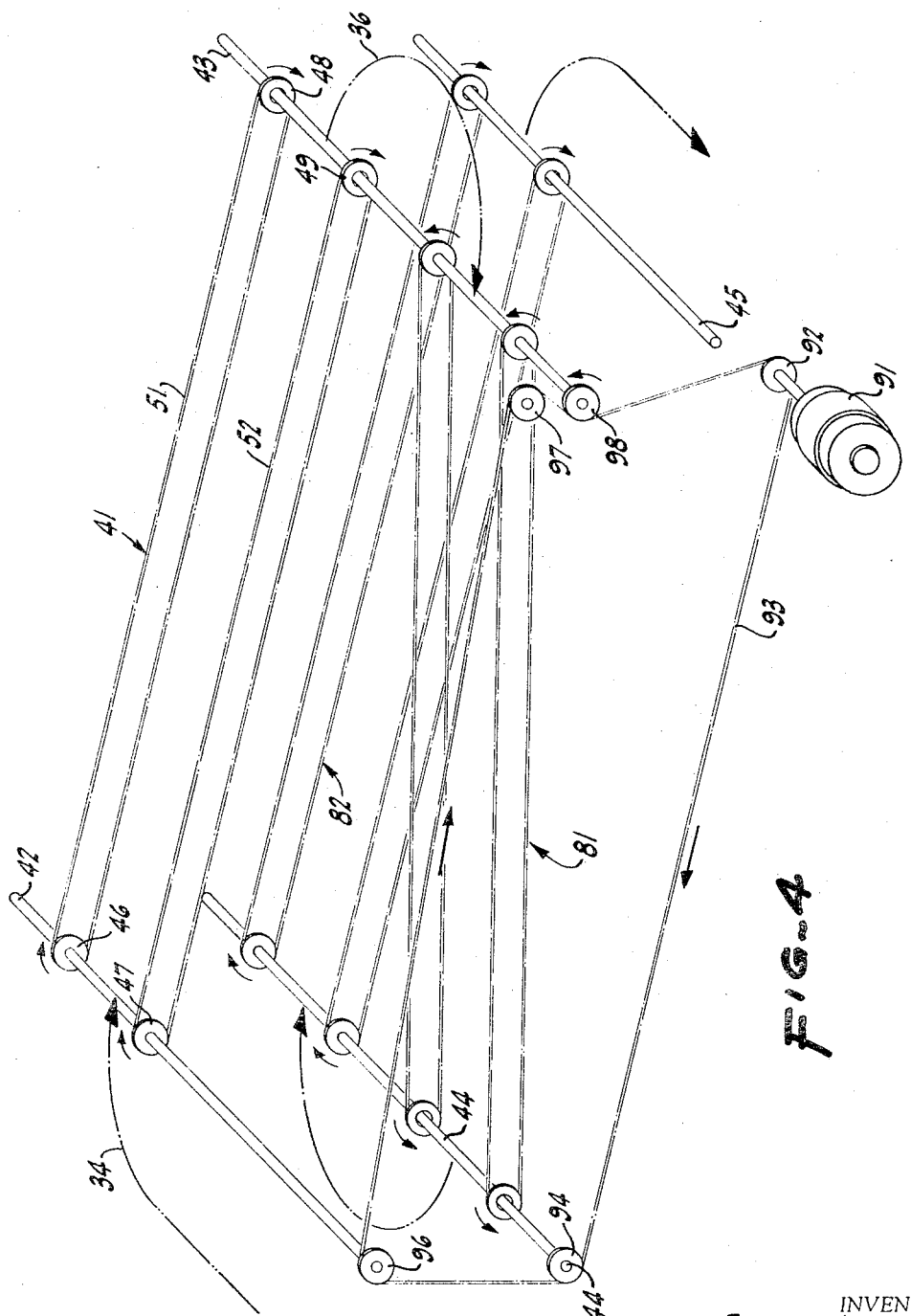

# United States Patent Office 3,303,918
Patented Feb. 14, 1967

3,303,918
FREEZING CHAMBER CONVEYOR
Eugene Larson, Millbrae, Calif., assignor to National
Industrial Equipment Co., a corporation
Filed June 14, 1965, Ser. No. 463,536
8 Claims. (Cl. 198—103)

My invention relates to means for handling articles to be frozen in their travel through a substantially enclosed chamber in which they are subjected to a freezing process, the arrangement being such that items are carried through in an even, continuous fashion with a large part of the volume of the chamber being occupied by the materials being conveyed.

In recent years, there has been an increasing demand for mechanisms for handling articles to be frozen. These often are carried on trays and should be smoothly and economically carried through a freezing chamber without jerking or abrupt actions and in such a fashion that the freezing is accomplished as the article travels from the inlet to the discharge of the chamber. It is also important to have a mechanism that can operate well at reduced temperatures and that is particularly free from mechanical failures or other causes of abrupt and protracted shutdowns.

It is therefore an object of the invention to provide an improved freezing chamber conveyor effective to carry a large number of articles through a freezing chamber in a compact and economical fashion and in a smooth way which will not disturb the contents of the article carriers and will not disturb the articles themselves.

Another object of the invention is to provide a freezing chamber conveyor that is quite simple from the mechanical aspect and can be expected to operate well and smoothly for a long period of time.

Another object of the invention is to provide a freezing chamber conveyor that can readily be integrated with other handling machinery in a factory.

Another object of the invention is to provide a freezing chamber conveyor that is economical in its use of power and does not add appreciably to the cost of handling articles to be frozen.

Other objects of the invention together with the foregoing are attained in the form of device described in the accompanying description and illustrated in the accompanying drawings, in which:

FIGURE 2 is a view generally on a vertical plane taken just inside the wall of the enclosing chamber, the planes of section being indicated by the lines 2—2 of FIGURE 1;

FIGURE 3 is an enlarged detail of a portion of the freezing chamber conveyor, the plane of section being indicated by the line 3—3 of FIGURE 2; and FIGURE 4 is a diagram showing an isometric projection the path of movement of articles to be frozen through the freezing chamber conveyor and also illustrating the drive mechanism.

Figure 1:
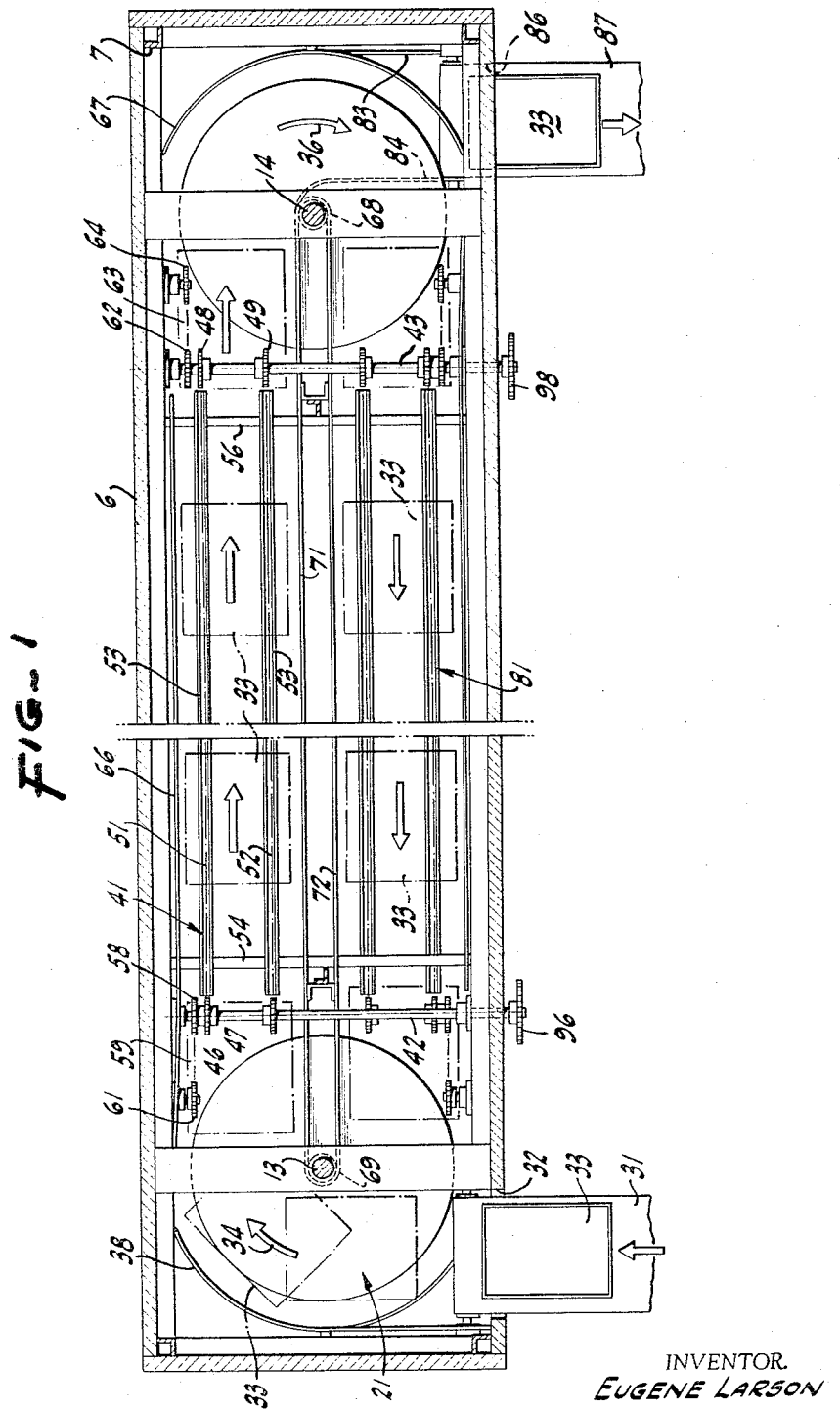
FIGURE 1 is for the most part a plan of a freezing chamber conveyor constructed in accordance with the invention, the upper portion of the enclosing chamber being cut away to reveal certain parts in cross section on a horizontal plane.

In its preferred embodiment, the freezing chamber conveyor pursuant to the invention is designed to be installed in a generally closed chamber or room 6 including a number of walls appropriately isolating a volume connected to a supply of cold air or the like (not shown). Within the chamber 6, there is provided a frame 7 comprised of the customary angles, channels and the like to provide an elongated support for the rest of the mechanism.

Situated on the frame 7 and respectively disposed adjacent opposite ends thereof are pairs of vertically arranged journals 8 and 9 at one end of the device and journals 11 and 12 at the other end of the device. Designed to operate in the journals is a pair of upright shafts 13 and 14, each arranged to rotate about its respective one of a pair of axes 16 and 17. The axes are arranged vertically and substantially in a vertical central plane in the intermediate portion of the frame 7.

Located on the shaft 13 is a planar platform 21 including radial ribs 22 reinforcing the connection of the platform with a central hub 23 encompassing and secured to the shaft 13. The platform 21 is circular in plan and extends quite close to the walls of the chamber 6 and is disposed at a relatively high location just under the ceiling of the chamber 6.

Mounted on the shaft 14 is a comparable planar circular platform 26 arranged to run quite closely to the walls of the chamber 6 at the other end thereof and situated at an intermediate height somewhat lower than the height of the platform 21. In a similar fashion, the shaft 13 also carries a platform 27 disposed beneath the platform 21 and at a much lower elevation than the platform 26. Furthermore, the shaft 14 also carries another platform 28 disposed below the platform 26 and at a lower elevation than the platform 27, this platform 28 being the lowermost platform of all. Since the number of platforms can be increased almost without limit, depending upon the length or height of the shafts 13 and 14 and the height of the chamber 6, it is to be understood that the first relatively high platform 21, the second intermediate platform 26 and the third relatively low platform 27 are referred to as examples of the platforms that can be repeated in appropriate locations for increased capacity of the machine.

In order to send material into the freezing chamber, there is provided a feeding conveyor 31 extending from a remote point outside of the chamber 6 through a feeding opening 32 in the side wall of the housing 6 and ending in a location quite close to the margin of the first platform 21, the end of the conveyor 31 being approximately tangent to the edge of the platform 21. It is preferred that material to be frozen be carried on the conveyor 31 by means of appropriate, loose trays 33 or comparable holders of a size and character to cooperate with the various platforms. For example, a tray 33 impelled through the opening 32 by the conveyor 31 extends over and onto the upper platform 21 since the discharge level of the conveyor 31 is substantially the same as the level of the platform 21. The length of the tray and its stiffness are sufficient so that it bridges across the space intervening between the end of the conveyor 31 and the platform 21.

Pursuant to the invention, the shafts 13 and 14 are simultaneously revolved, the direction of rotation being as indicated by the arrows 34 and 36 in FIGURE 1. For this purpose, each of the shafts 13 and 14 extends above the chamber 6 and is provided with a driven sprocket 37 connected to a suitable driving motor capable of driving both of the shafts and their lading at the same speed. As the platform 21 revolves, it receives the tray 33 from the conveyor 31 and assists in turning the tray through approximately a quarter rotation. Preferably, there is an arcuate guide 38 secured to the frame 7 and disposed so that in the event the tray 33 becomes slightly dislodged, the arcuate guide 38 will help the tray to turn through about ninety degrees in a confined path.

To continue the advancement of a tray from the platform 21, a suitable conveyor mechanism is provided. Located on one side of the central plane of symmetry defined by the axes 16 and 17 is a conveyor means 41 disposed on the frame at an inclination and made up of a number of parts. Supporting the conveyor 41 is a first cross shaft 42 spanning the frame and located in a horizontal plane substantially containing the platform 21."

Similarly, adjacent the platform 26 and at about the same level as that platform is a second cross shaft 43 extending across the frame. Additionally, there is a cross shaft 44 spanning the frame and located beneath the shaft 42 and approximately at the level of the platform 27.

The shaft 42 adjacent one end carries a pair of sprockets 46 and 47 which are fast on the shaft 42 and are driven by it. Similarly, there is a pair of sprockets 48 and 49 on the shaft 43, but these sprockets are loosely mounted on the shaft 43 and although supported thereon are not rotated thereby. Trained around the pair of sprockets 46 and 48 and the pair of sprockets 47 and 49 are conveyor chains 51 and 52 having their upper runs supported in channels 53 stopping just short of their adjacent sprockets and fastened on cross beams 54 and 55 forming part of the main frame. The lower runs 57 of the inclined conveyor chain are substantially parallel to the upper runs thereof, but are permitted to follow their own configuration.

Since the inclined portion of the conveyor does not come particularly close to the platforms 21 and 26, I provide a short chain run adjacent each of the platforms. On the shaft 42 there is provided an additional outboard sprocket 58 with which is engaged one end of a short conveyor chain 59, the other end of which is trained around an idler sprocket 61 secured to the frame side. The sprocket 58 is fastened to the shaft 42 so that the direction of advance of the upper run of the short conveyor 59 is the same as that of the inclined portion of the conveyor. There is a difference in that the short conveyor chain is substantially horizontal with its upper run at the same level or substantially so as that of the platform 21, so that there is a smooth merger between the plane of the chain 59 and that of the chain 51 around the sprockets 46 and 58 of similar diameters.

In a comparable fashion, the shaft 43 also carries an outboard sprocket 62 supporting one end of a short conveyor chain 63 trained around an idler sprocket 64, the upper run of the chain 63 being disposed approximately at the level of the second or intermediate platform 26. The sprocket 64, as is the sprocket 61, is disposed quite close to the margin of the platform 26.

With this arrangement, as the tray 33 rounds the quarter turn on the platform 21, it eventually is directed onto the short conveyor chain 59 and finally onto the inclined conveyor 51. So that the support is properly directed, there is provided an outer guide means 66 in the nature of a straight strap secured to the frame 7 and extending from a point near the end of the arcuate guide 38 and terminating short of the conveyor chain 63 but approximately tangent to an arcuate guide 67 on the frame and encompassing the second platform 26.

In a somewhat similar fashion, the shafts 13 and 14 are provided with arcuate central portions 68 and 69 of an interior guide having stretches 71 and 72 appropriately mounted on the frame and symmetrical about the upright central plane thereof. The guides 71 and 72 are parallel with the guide 66. The arcuate guides 38 and 67 as well as the arcuate ends 68 and 69 of the guides 71 and 72 are concentric with the axes 16 and 17. Thus a tray leaving the platform 21 is assisted by the level portion of the short chain 59 onto the inclined conveyor 51. This transition is a smooth and continuous one so that the contents of the tray are not unduly jostled and, if they are liquid, are not spilled. Furthermore, the inclination of the conveyor 51 and 52 is relatively slight so that there is not likely to be any spillage from the tray in the event its contents are liquid.

Finally, the descending tray on the conveyor chains 51 and 52 is assisted by the short chain 63 onto the intermediate platform 26 and is guided around that platform while supported thereon between the arcuate guide 67 and the curved portion of the central guides 71 and 72.

In exactly the same fashion as described, there is provided on the opposite side of the central plane of the machine an inclined conveyor 81 made up of duplicates of the previously described parts and leading from the intermediate platform in a downward direction to the lower platform 27. Also, as a repetition of the previous structure, there is provided another descending conveyor 82 on the frame located just below the conveyor chains 51 and 52. In this fashion, the tray which is advanced by the conveyors in succession and by contact with the intervening platforms is brought lower and lower on what may be termed a helical or spiral path alternating on opposite sides of the central plane.

Finally, a tray having completed the circuit is discharged from the lowermost platform 28. Adjacent that platform there are provided straight guides 83 and 84 in effect continuing the guides 67 and 71 and 72 to direct the tray through a discharge opening 86 in the chamber 6 and onto a discharge conveyor 87 leading to a point of further use. The time involved in transporting the tray, such as 33, from the opening 32 to the opening 86 is sufficiently long to assure the extraction of heat desired. Throughout its entire traverse, the tray is handled smoothly and without jerks and is nevertheless directed in opposite directions. This factor is taken advantage of in some instances by having a directional current of air flowing through the chamber 6.

In addition to the drives for the shafts 16 and 17, a drive is provided for the various shafts 42, 43, 44 and 45 and the like. This drive is accomplished particularly as shown in FIGURE 3 by means of an electric motor 91 suitably mounted on the frame and provided with a sprocket 92 engaged by a drive chain 93 which travels over a sprocket 94 on the shaft 44 as well as over a sprocket 96 on the shaft 42. From the sprocket 96, the chain 93 extends around an idler sprocket 97 and from there around a sprocket 98 on the shaft 43 and back to the sprocket 92. With this arrangement, and since the direction of rotation of the motor is clockwise as seen in FIGURE 3, the shaft 42 is rotated in a clockwise direction, as is the shaft 43. Since the sprockets 46 and 47 are fast on the shaft 42 and since the sprockets 48 and 49 are loose on the shaft 43, the conveyor chains 51 and 52 are driven in the appropriate direction toward the right in FIGURE 3.

Because the chain 93 extends around the sprocket 98 on the opposite side thereof, the shaft 43 is rotated in a counterclockwise direction as seen in FIGURE 3 and carries its related conveyor sprockets and chains toward the left in that figure. At the same time, the conveyor 82 beneath the conveyor chains 51 and 52 is carried in the same direction as the chains 51 and 52. Preferably, the motor 91 is either connected directly to the sprockets 37 on the shafts 13 and 14 or separate drive means provided therefor are interrelated to the motor 91 in such a fashion that the mean linear speed on the platforms is substantially the same as the mean linear speed of the various conveyors. While some speed-up or slow-down can be accomplished, it is preferred to operate all of the conveying instrumentalities at the same linear rate.

In commercial embodiments of the freezing chamber conveyor described herein, it has been found that large quantities of materials on appropriate trays can be smoothly and easily translated or carried through the freezing chamber without spillage of the goods and with expectation of long, troublefree operation with the goods being arranged within the chamber in a compact form for high capacity.

What is claimed is:

1. A freezing chamber conveyor comprising an elongated frame; vertically arranged journals on said frame adjacent the opposite ends thereof; a pair of upright shafts mounted in said journals for rotation about vertical axes; planar, circular platforms on said shafts extending perpendicularly to said axes, said platforms being at different levels on said shafts; a guide bar on said frame spaced from but approximately curved around said platforms and merging with said guide bar; a conveyor mounted at an inclination on said frame and extending between said platforms, said conveyor including a relatively long chain run adjacent said guide bar and a relatively short chain run remote from said guide bar; and means on said frame for simultaneously rotating said shafts and advancing said conveyor.

2. A freezing chamber conveyor as in claim 1 in which said relatively long chain run is made up of a central, inclined chain and two horizontal chains at the opposite ends thereof each at the approximate level of the adjacent platform.

3. A freezing chamber conveyor as in claim 1 in which there is a feeding conveyor on said frame disposed approximately at the same level as and close to one side of one of said platforms.

4. A freezing chamber conveyor as in claim 1 in which there is a discharge conveyor on said frame disposed approximately at the same level as and close to the other side of another of said platforms.

5. A freezing chamber conveyor as in claim 1 in which each of said upright shafts has a plurality of platforms thereon, all of said platforms being at different levels, and in which said frame has a plurality of said conveyors extending between said platforms, said conveyors being disposed at opposite inclinations.

6. A freezing chamber conveyor comprising an elongated frame; journals on said frame adjacent the opposite ends thereof; a pair of shafts mounted in said journals for rotation about a pair of axes disposed in an upright plane located substantially in the middle of said frame; planar, circular platforms on said shafts extending perpendicularly of said axes, said platforms being disposed at different levels; conveyor shafts extending across said frame and respectively located adjacent said platforms approximately at the level thereof; an endless conveyor mounted on said shafts and disposed on one side of said upright plane; an outer guide means on said frame and extending at least part way around said platforms and alongside said conveyor; inner guide means extending substantially between said shafts; and means for operating said shafts and advancing said conveyor in unison.

7. A freezing chamber conveyor comprising an elongated frame; journals on said frame adjacent the opposite ends thereof; a pair of shafts mounted in said journals for rotation about a pair of axes disposed in an upright plane located substantially in the middle of said frame; a first circular platform at a relatively high level on one of said shafts and extending perpendicularly to said shaft; a second circular platform at a relatively intermediate level on the other of said shafts and extending perpendicularly to said shaft; a third circular platform at a relatively low level on the first one of said shafts and extending perpendicularly to said shaft; a plurality of conveyor shafts extending across said frame and each respectively located adjacent to and approximately at the level of one of said platforms; a first endless conveyor mounted on the first and second ones of said shafts and disposed on one side of said upright frame at a predetermined inclination; a second endless conveyor mounted on the second and third ones of said shafts and disposed on the other side of said upright frame at an opposite predetermined inclination; outer guide means on said frame and extending at least part way around said platforms and alongside said first and said second conveyors; inner guide means extending substantially between said shafts; and means for rotating said shafts and advancing said first and said second conveyors in unison.

8. A freezing chamber conveyor as in claim 7 in which said first conveyor at opposite ends includes horizontal extensions substantially coplanar with and disposed close to the edge of said first platform and said second platform.

References Cited by the Examiner

UNITED STATES PATENTS

| 1,489,926 | 4/1924 | Burtchaell | 198—25 |
| 1,948,090 | 2/1934 | Alvey | 198—136 |
| 2,683,523 | 7/1954 | Rottersmann | 198—127 X |

FOREIGN PATENTS 1,385,156  11/1964  France.

EVON C. BLUNK, *Primary Examiner.*

A. C. HODGSON, *Assistant Examiner.*